(12) United States Patent
Deng et al.

(10) Patent No.: US 9,143,394 B2
(45) Date of Patent: *Sep. 22, 2015

(54) SYSTEM AND METHOD FOR GRAPH BASED K-REDUNDANT RESILIENCY FOR IT CLOUD

(71) Applicant: International Business Machines Corporation, Armonk, NY (US)

(72) Inventors: Yu Deng, Yorktown Heights, NY (US); Alexei A. Karve, Mohegan Lake, NY (US); Andrzej Kochut, Croton-on-Hudson, NY (US); Randy A. Rendahl, Raleigh, NC (US); Anca Sailer, Scarsdale, NY (US); Hidayatullah Shaikh, Shrub Oak, NY (US); Angel E. Tomala-Reyes, Flushing, NY (US)

(73) Assignee: International Business Machines Corporation, Armonk ( * ) Notice: Subject to any disclaimer, the term of this patent is extended or adjusted under 35 U.S.C. 154(b) by 19 days.

This patent is subject to a terminal disclaimer.

(21) Appl. No.: 13/969,864

(22) Filed: Aug. 19, 2013

(65) Prior Publication Data

US 2014/0310559 A1 Oct. 16, 2014

Related U.S. Application Data

(63) Continuation of application No. 13/859,956, filed on Apr. 10, 2013.

(51) Int. Cl.
*G06F 11/00* (2006.01)
*H04L 12/24* (2006.01)
(Continued)

(52) U.S. Cl.
CPC ........ *H04L 41/0604* (2013.01); *G06F 9/45533* (2013.01); *G06F 11/008* (2013.01);
(Continued)

(58) Field of Classification Search
CPC .............. G06F 11/008; G06F 9/45533; H04L 67/1042; H04L 67/1048; H04L 67/1095; H04L 41/0604
USPC ........................................ 714/4.1, 26, 37, 43
See application file for complete search history.

(56) References Cited

U.S. PATENT DOCUMENTS 7,103,874 B2 * 9/2006 McCollum et al. ........... 717/121
7,466,656 B2 12/2008 Dube et al.
(Continued)

OTHER PUBLICATIONS

Clemente, Robert, et al., Risk Management in Availability SLA, 2005, IEEE, pp. 411-418.*
(Continued)

*Primary Examiner* — Marc Duncan
(74) *Attorney, Agent, or Firm* — Harrington & Smith; Louis J. Percello (57) ABSTRACT

An apparatus for enabling resiliency for cloud computing systems is provided. An apparatus includes a processor and a memory storing computer program code. The memory and the computer program code are configured to, with the processor, cause the apparatus to perform actions. The actions include modifying a topology graph of a network architecture by mapping processes flows onto the topology graph and creating a resiliency graph based on the modified topology graph. The actions also include modifying the resiliency graph by translating at least one SLA into the resiliency graph and identifying overlaps and dependencies in the modified resiliency graph. Apparatus and computer readable instructions are also described.

20 Claims, 8 Drawing Sheets

(51) Int. Cl.
*H04L 29/08* (2006.01)
*G06F 9/455* (2006.01)

(52) U.S. Cl.
CPC ............ *H04L41/0663* (2013.01); *H04L 41/12* (2013.01); *H04L 41/5019* (2013.01); *H04L 67/1095* (2013.01)

(56) References Cited

U.S. PATENT DOCUMENTS

| | | | |
|---|---|---|---|
| 7,903,970 | B2 | 3/2011 | Liu |
| 7,911,978 | B1 | 3/2011 | Chandra et al. |
| 7,933,247 | B2 | 4/2011 | Gidwani |
| 7,961,603 | B2 | 6/2011 | Harrabida et al. |
| 7,975,185 | B2 * | 7/2011 | Kaefer et al. ............... 714/47.1 |
| 8,082,335 | B2 | 12/2011 | Mishra et al. |
| 8,122,281 | B2 * | 2/2012 | Bansal et al. .................... 714/3 |
| 8,856,295 | B2 * | 10/2014 | Aliminati ....................... 709/222 |
| 2003/0005119 | A1 * | 1/2003 | Mercier et al. ............... 709/225 |
| 2004/0049509 | A1 * | 3/2004 | Keller et al. .................. 707/100 |
| 2007/0136788 | A1 * | 6/2007 | Monahan et al. .................. 726/3 |
| 2007/0282649 | A1 * | 12/2007 | Davis et al. ......................... 705/7 |
| 2009/0171731 | A1 * | 7/2009 | Bobak et al. ....................... 705/8 |
| 2009/0254894 | A1 * | 10/2009 | Chen et al. ..................... 717/155 |
| 2010/0107015 | A1 * | 4/2010 | Bernabeu-Auban et al. ... 714/38 |
| 2010/0138688 | A1 * | 6/2010 | Sykes et al. ......................... 714/4 |
| 2010/0306372 | A1 | 12/2010 | Gorman et al. |
| 2012/0128135 | A1 | 5/2012 | Sun |
| 2013/0246105 | A1 * | 9/2013 | Winkler et al. ............... 705/7.11 |
| 2014/0208167 | A1 * | 7/2014 | Krampen et al. ............... 714/37 |

OTHER PUBLICATIONS

Blake, M. Brian and David J. Cummings, Workflow Composition of Service Level Agreements, 2007, IEEE, pp. 1-8.*
Sterbenz, James P.G., et al., Modeling and Analysis of Network Resilience, 2011, IEEE, pp. 1-10.*
Autenrieth, Achim and Andreas Kirstadter, Engineering End-to-End IP Resilience Using Resilience-Differentiated QoS, Jan. 2002, IEEE Communications Magazine, pp. 50-57.*
Najjar, Walid and Jean-Luc Gaudiot, Network Resilience: A Measure of Network Fault Tolerance, 1990, IEEE, pp. 174-181.*
Schaeffer-Filho, Alberto, et al., A Framework for the Design and Evaluation of Network Resilience Management, 2012, IEEE Network Operations and Management Symposium, pp. 401-408.*
Shamsi, J., & Brockmeyer, M. (May 2009). QoSMap: Achieving quality and resilience through overlay construction. Fourth International Conference on Internet and Web Applications and Services, 58-67.
Constantinou, C. C., Stepanenko, A. S., Arvanitis, T. N. et al. (2008). Resilient recursive routing in communication networks. Handbook of Applied Algorithms: Solving Scientific, Engineering, and Practical Problems, A. Nayak, & I. Stojmenovic, (Eds.), 485-507.

* cited by examiner

FIG. 10

SYSTEM AND METHOD FOR GRAPH BASED K-REDUNDANT RESILIENCY FOR IT CLOUD

CROSS-REFERENCE TO RELATED APPLICATIONS

This application is a continuation of Ser. No. 13/859,956, filed on Apr. 10, 2013, by inventors Yu Deng et al., entitled "SYSTEM AND METHOD FOR GRAPH BASED K-REDUNDANT RESILIENCY FOR IT CLOUD", hereby incorporated by reference in its entirety.

TECHNICAL FIELD

The exemplary and non-limiting embodiments relate generally to cloud computing systems, methods, devices and computer programs and, more specifically, relate to providing resiliency for cloud computing systems.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Cloud computing allows the use of computing resources (such as hardware and software) over a network (such as the Internet for example). Using cloud computing, remote devices are allowed to access a user's data as well as to use software applications.

Information technology (IT) clouds may be implemented as virtualized data centers and enabled the creation, deployment, management and usability of new services. Distributed users, both individuals and businesses, can take advantage of the cloud services in order to provide automation and scalability. Additionally, many implementations may suffer from points of failure that could impact larger number of users.

What is needed is a technique to evaluate a cloud architecture and determine ways to provide improved resiliency.

SUMMARY

The below summary section is intended to be merely exemplary and non-limiting.

In an exemplary aspect a method for enabling resiliency for cloud computing systems is provided. The method includes modifying a topology graph of a network architecture by mapping processes flows onto the topology graph. A resiliency graph is created based on the modified topology graph. The method includes modifying the resiliency graph by translating at least one SLA into the resiliency graph. Overlaps and dependencies in the modified resiliency graph are identified.

In another exemplary aspect an apparatus for enabling resiliency for cloud computing systems is provided. An apparatus includes a processor and a memory storing computer program code. The memory and the computer program code are configured to, with the processor, cause the apparatus to perform actions. The actions include modifying a topology graph of a network architecture by mapping processes flows onto the topology graph and creating a resiliency graph based on the modified topology graph. The actions also include modifying the resiliency graph by translating at least one SLA into the resiliency graph and identifying overlaps and dependencies in the modified resiliency graph.

In a further exemplary aspect an article of manufacture (such as a computer readable memory) for enabling resiliency for cloud computing systems is provided. The article of manufacture tangibly embodies computer readable instructions which, when implemented, cause a computer to carry out the steps of a method. The method includes modifying a topology graph of a network architecture by mapping processes flows onto the topology graph and creating a resiliency graph based on the modified topology graph. The method also includes modifying the resiliency graph by translating at least one SLA into the resiliency graph and identifying overlaps and dependencies in the modified resiliency graph.

In another exemplary aspect an apparatus for enabling resiliency for cloud computing systems is provided. The apparatus includes means for modifying a topology graph of a network architecture by mapping processes flows onto the topology graph and means for creating a resiliency graph based on the modified topology graph. The apparatus also includes means for modifying the resiliency graph by translating at least one SLA into the resiliency graph and means for identifying overlaps and dependencies in the modified resiliency graph.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

The on-demand aspects of cloud computing, such as the scalability and flexibility to enable more and more systems to support/provide automation, make it difficult to apply traditional high availability (HA) architectures and delivery methods.

Various exemplary embodiments provide techniques for discovering and creating a network topology graph including a resiliency graph. The method includes classifying flows and processes based on resilience requirements and mapping them on top of the topology graph. An initial resiliency graph is created and subsequent service level agreement (SLA) constraints are translated into the resiliency graph. System overlaps and dependencies are identified along with points of failure. Resiliency is calculated in view of an optimally sharing backup infrastructure. Additionally, planning is included for virtual environment capacity, high availability, and migration. A unified resiliency graph is created with 1:K replication for critical system and K:1 sharing of primary and backup capacity for independent sub-processes.

Shared virtual machines (VM) can manage different service level agreements (SLA). Thus, VMs should not share k-redundant system but can share back-up with independent systems. Shared application cannot manage different SLA so it is recommended to split the application functionality (such as between client UI and business support UI for example).

A service topology representation can be used to identify the service composition by mapping the infrastructure and resource allocation based on scalability requirements. This service topology representation can then be altered to satisfy HA requirements. The resulting representation can be provided as an output. In such as way, a particular topology graph can be modified and output as a new graph optimized for HA.

Figure 1:
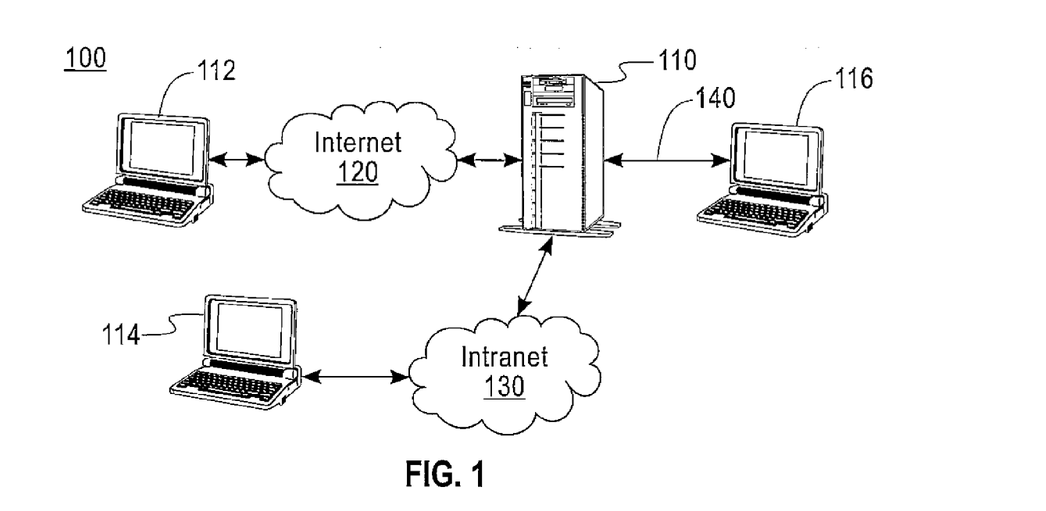
FIG. 1 illustrates a simplified diagram of a cloud computing system.

FIG. 1 illustrates a simplified diagram of a cloud computing system 100. The cloud computing system 100 is provided by a server 110 (which may include one or more individual server units). Computers 112, 114, 116 may connect to the server 110 using a variety of interfaces. A first computer 112 is connected to the server 110 via the internet 120 and a second computer 114 is connected via an intranet 130. In this non-limiting example, as third computer 116 may also connect to the server 110 using a direct connection 140, such as a hardwired connection or local wireless connection. One or more computers 112, 114, 116 may be connected to the server at a single time, for example, all three of computers 112, 114, 116 may be access the cloud computing system 100 simultaneously.

The server 110 provides cloud computing services to the computers 112, 114, 116. Services may be provided by independent processes or shared processes (where one or more process subsystems for multiple processes are performed by a single process). While an independent process is relatively secure from issues facing other processes, an independent process may use additional system resources (such as processor time, memory, etc.). Conversely, shared processes may provide more efficient use of system resources but a single failure may result in multiple processes being adversely impacted.

Figure 2:
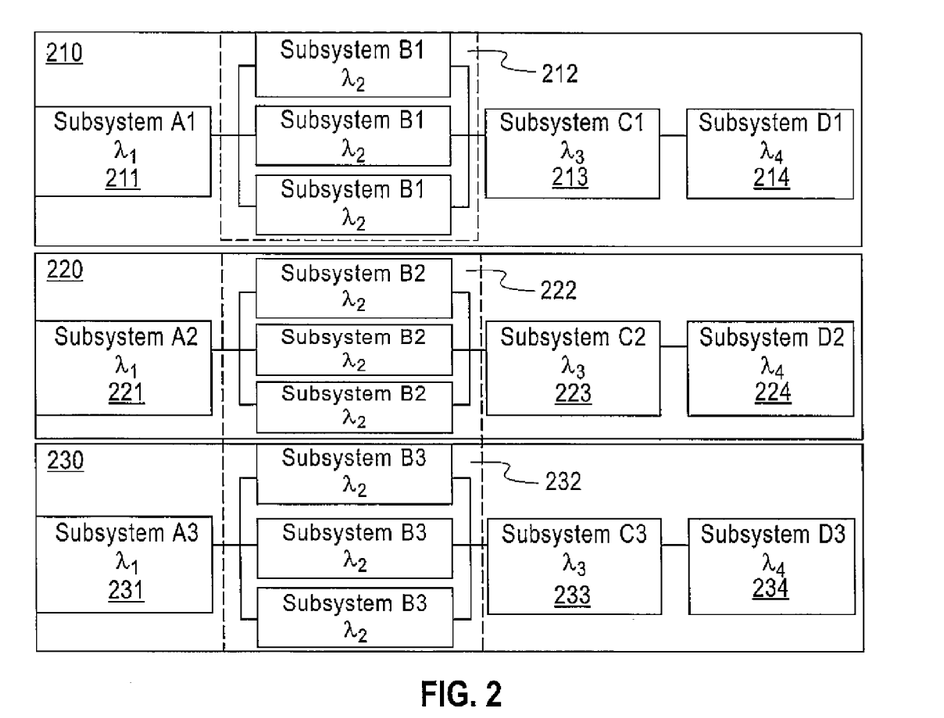
FIG. 2 is a simplified services process graph for three processes in a cloud computing system.

FIG. 2 is a simplified services process graph for three processes (or virtual machines (VM)) 210, 220, 230 in a cloud computing system. The three processes are a high-critical process 210, a mid-critical process 220 and a low-critical process 230. The high-critical process 210 includes four subsystem—a first subsystem 211, a second subsystem 212, which includes three parallel threads, a third subsystem 213 and a fourth subsystem 214. Likewise the mid-critical process 220 includes a first subsystem 221, a second subsystem 222, a third subsystem 223 and a fourth subsystem 224 of mid-critical process 220, while the low-critical process 230 includes a first subsystem 231, a second subsystem 232, a third subsystem 233 and a fourth subsystem 234.

In a first, non-limiting example, the third subsystem 213, the third subsystem 223 and the third subsystem 233 are shared by all three processes. For example, a single module/thread on a processing unit may perform the actions of the third subsystems 213, 223, 233. In such cases, the processes may be split/duplicated for operation by different processing units or different modules in the same processing unit. Alternatively, HA requirements may be applied to the most critical aspects of the processes.

In another, non-limiting example, the high-critical process 210 and the mid-critical process 220 share subsystems C 213, 222 and subsystems D 214, 224. For critical HA, these subsystems (as well as their backup) do not share the same hypervisor/virtual machine manager. For low HA, these subsystems (as well as their backup) can share the same infrastructure.

In a further, non-limiting example, subsystems B 212, 222, 232 are replicated for workload management. In the cloud computing system, if all VMs are on the same hypervisor, the HA may be compromised and a primary and backup split is considered in order to ensure satisfactory HA performance. Such a split may be referred to as application replication.

Application replication provides an application based model centric replication model. This replication is focused on keeping consistent database (DB) content when data replicates. Checkpoints are selected to communicate logically complete sets of information in order to reduce bandwidth use by avoiding intermediate DB updates and focuses on complete function. Replica sites are kept in a consistent state that is a delayed view of the whole.

Implementation options can vary for data transmission. For example, data transmission may be queue based when transaction packets can be contained, the transaction packets are for file replication, etc.

A peer to peer replication model may be used in order to sync two or more application environments. Each server is an equal peer with equal ownership of the data. Thus, no server is sole master/owner of the data.

Figure 3:
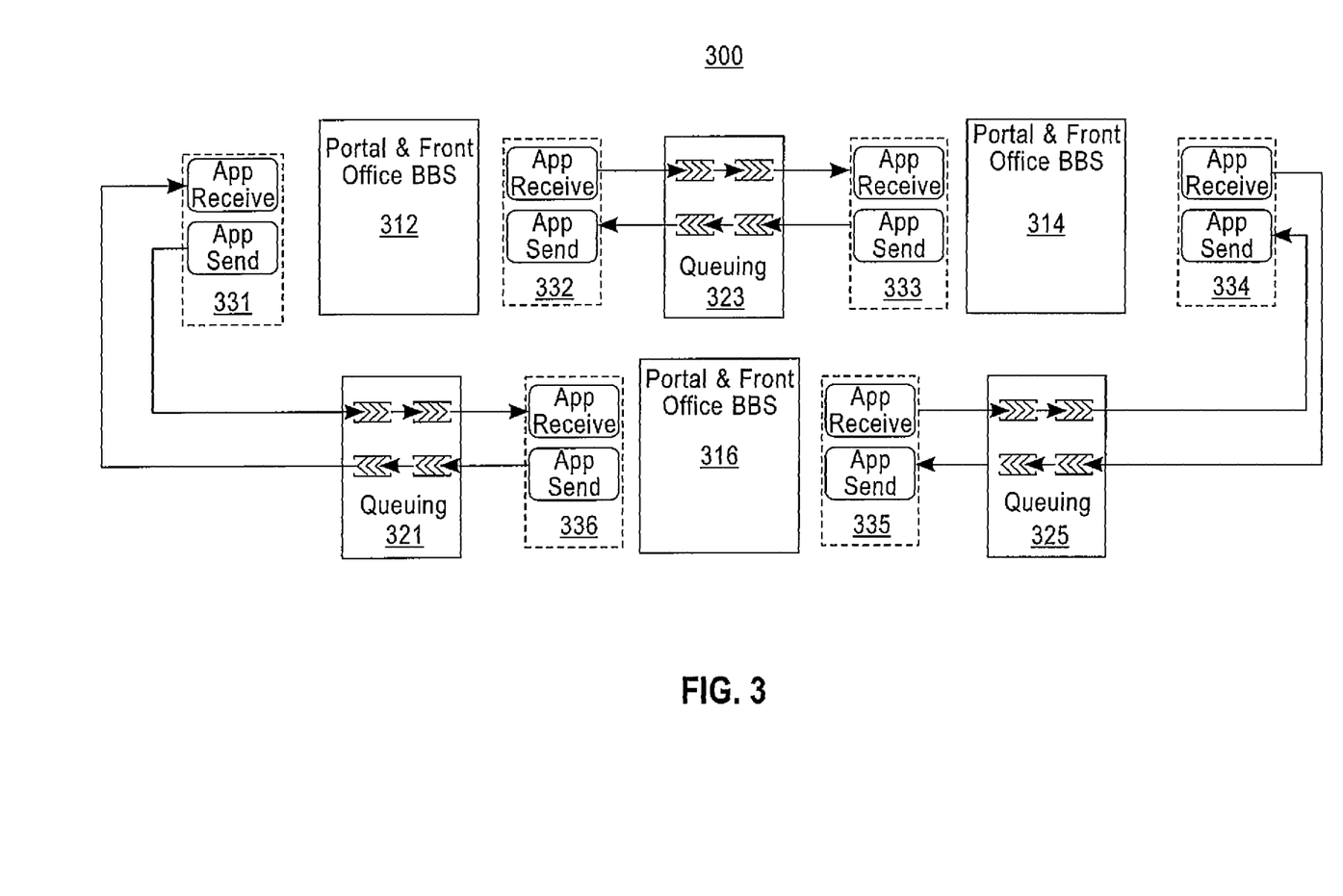
FIG. 3 shows a simplified diagram of an application replication situation.

FIG. 3 shows a simplified diagram of an application replication situation 300. Here, a first Portal & Front Office BBS 312, a second Portal & Front Office BBS 314 and a third Portal & Front Office BBS 316 are equal peers with equal ownership of data. The peers 312, 314, 316 communicate via a first queuing service 321, such as WebSphere MQ, a second queuing service 323 and a third queuing service 325.

The first Portal & Front Office BBS 312 includes an application receive/send process 331 for messages received at the first Portal & Front Office BBS 312 from third Portal & Front Office BBS 316 and sent to the third Portal & Front Office BBS 316 from first Portal & Front Office BBS 312 via the first queuing service 321 and an application receive/send process 332 for messages received at the first Portal & Front Office BBS 312 from second Portal & Front Office BBS 314 and sent to the second Portal & Front Office BBS 314 from first Portal & Front Office BBS 312 via the second queuing service 323.

The second Portal & Front Office BBS 314 includes an application receive/send process 333 for messages received at the second Portal & Front Office BBS 314 from first Portal & Front Office BBS 312 and sent to the first Portal & Front Office BBS 312 from second Portal & Front Office BBS 314 via the second queuing service 323 and an application receive/send process 334 for messages received at the second Portal & Front Office BBS 314 from third Portal & Front Office BBS 316 and sent to the third Portal & Front Office BBS 316 from second Portal & Front Office BBS 314 via the third queuing service 325.

The third Portal & Front Office BBS 316 includes an application receive/send process 336 for messages received at the third Portal & Front Office BBS 316 from second Portal & Front Office BBS 314 and sent to the second Portal & Front Office BBS 314 from third Portal & Front Office BBS 316 via the third queuing service 325 and an application receive/send process 335 for messages received at the third Portal & Front Office BBS 316 from first Portal & Front Office BBS 312 and sent to the first Portal & Front Office BBS 312 from third Portal & Front Office BBS 316 via the first queuing service 321.

In order to ensure that particular subsystems do not share the same hypervisor/virtual machine manager Q Replication may be used. Q replication is a high-volume, low-latency replication solution that uses queuing (such as WebSphere MQ for example) to transmit transactions between source and target databases or subsystems. For Q replication, a peer to peer replication model may be used in order to add two or more database instances or clusters. All servers are equal peers with equal ownership of the data. Thus, no server is the master or owner of the data.

Figure 4:
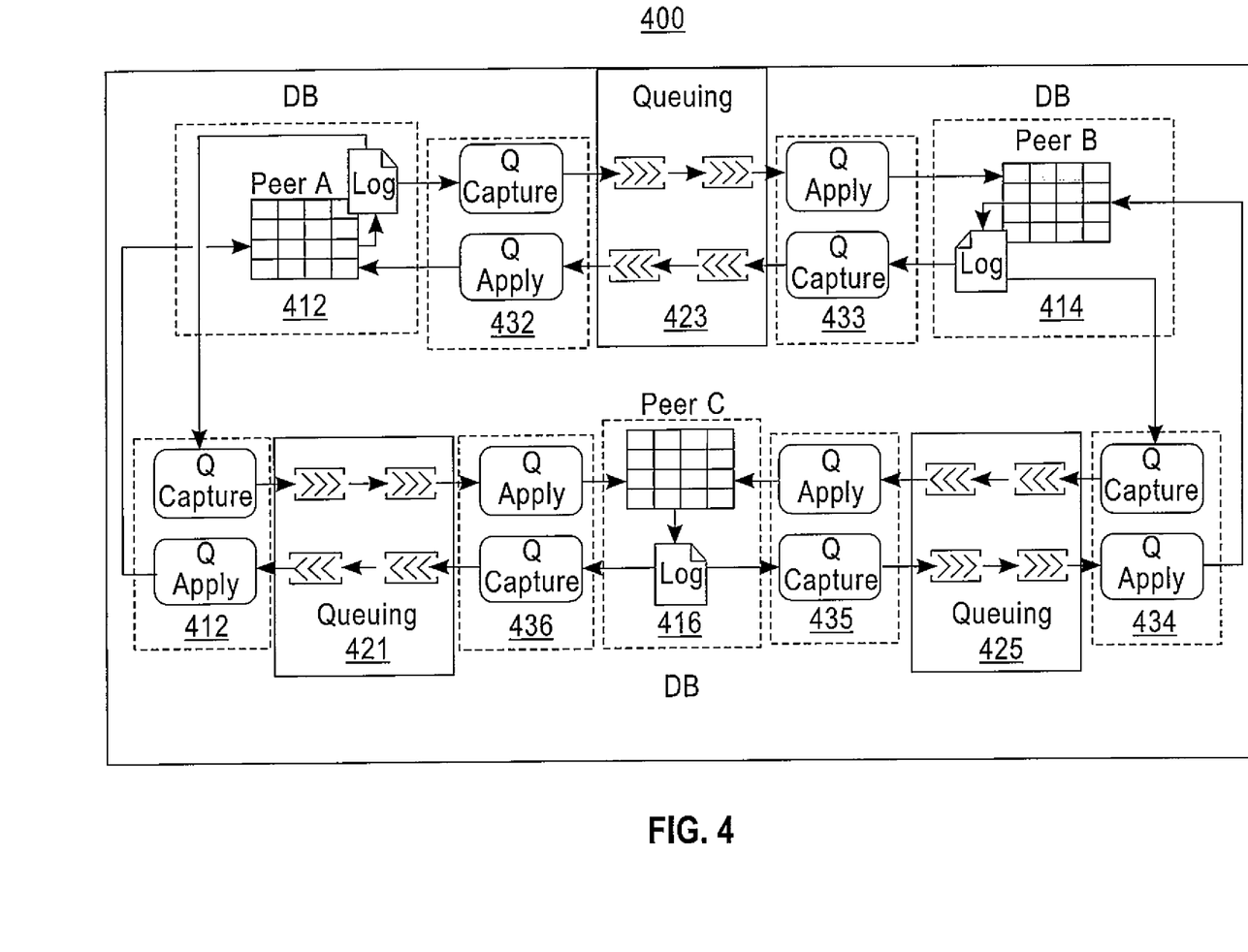
FIG. 4 shows a simplified diagram of a Q replication situation.

FIG. 4 shows a simplified diagram of a Q replication situation 400. Three peers, peer A 412, peer B 414 and peer C 416 provide replicated data (including logs). The peers 412, 414, 416 communicate via a first queuing service 421, such as WebSphere MQ, a second queuing service 423 and a third queuing service 425. Peer A includes a first Q capture/apply interface 431 and a second Q capture/apply interface 432 to handle communications. Likewise, peer B 414 includes a third Q capture/apply interface 433 and a fourth Q capture/apply interface 434 and peer C includes a fifth Q capture/apply interface 435 and a sixth Q capture/apply interface 436.

Application replication enables systems to target changes that need replication to peers and avoids replicating transitional data. Network bandwidth usage is more controlled and contained and latency is related to the granularity (design) of application replication. Furthermore, collision management can be more intelligent and robust in order to manage collisions (such as deletes, updates, etc.). Using broad-based code changes, application replication can communicate data updates to peers and incorporate remote changes into operational data in the peers. Care should be taken to re-asses flows for new features to ensure every release replicates properly, such as during development activities and/or testing for example.

Q Replication is managed by the database (such as, DB2, for example) and provides transparent replication (from a development activity point of view). This replication is low latency and asynchronous. Collisions are mitigated through a policy which determines which data should supersede the other.

Data configuration may be used when a new table or column is introduced or removed. This can cause high bandwidth consumption. Furthermore, data model consistency is not ensured at any given point in time. Rather, caching mechanisms can be used to be aware of important changes in order to maintain adequate caches in peer systems. This can lead to possible replication of transitional data, but that can be avoided by not synchronizing targeted columns/tables or adapting code to transition data to specific tables.

In one, non-limiting example of a cloud computing system, a business support service (BSS) system may be provided. A $BSS_{Front\ Office}$ may be used to provide customers with various services. The $BSS_{Front\ Office}$ can provide the UI, API and minimal BSS capabilities needed for steady state use by customers. A $BSS_{Mid\ Office}$ may be used to provide business users access to other services. The $BSS_{Mid\ Office}$ can provide BSS capabilities like catalog management, customer on-boarding, reporting, metering, rating and interaction with Back Office systems.

Figure 5:
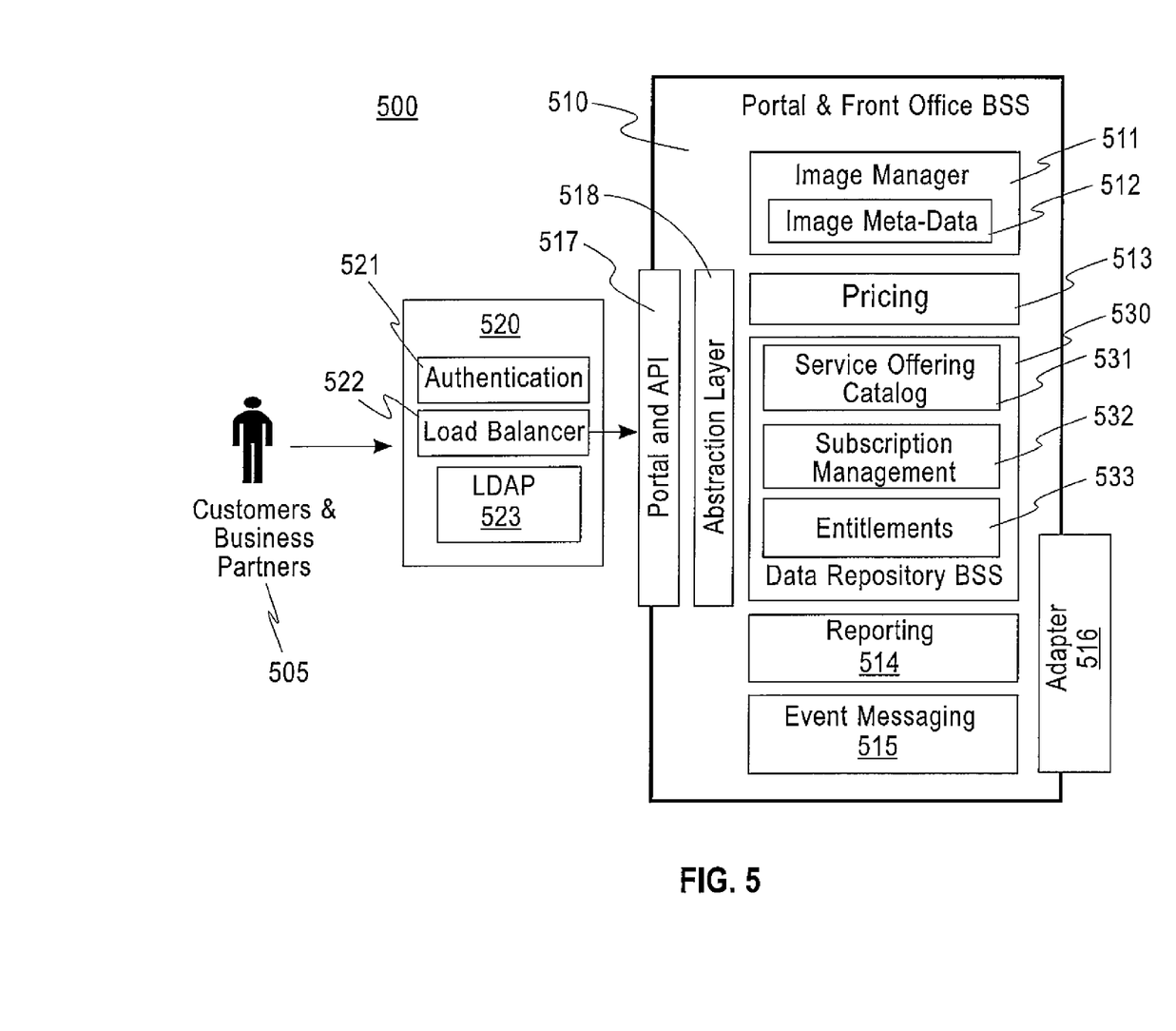
FIG. 5 demonstrates an exemplary embodiment of a $BSS_{Front\ Office}$.

FIG. 5 demonstrates an exemplary embodiment of a $BSS_{Front\ Office}$ 500. The Portal & Front Office BBS 510 provides cloud computing services for a customer/business partner 505. The Portal & Front Office BBS 510 includes various services, such as, an image manager 511. (which includes image meta-data 512), a pricing service 513, a data repository BSS 530, a reporting service 514 and an event messaging service 515. The data repository BSS 530 provides access to a service offering catalog 531, subscriber management 532 and entitlements 533. The web processing engine 520 also includes a tool specific adapter 516.

A web processing engine 520 provides modules for authentication 521, a load balancer 522 and lightweight directory access protocol (LDAP) 523. The web processing engine 520 communicates with the Portal & Front Office BBS 510 through a portal and API 517 and an abstraction layer 518.

Figure 6:
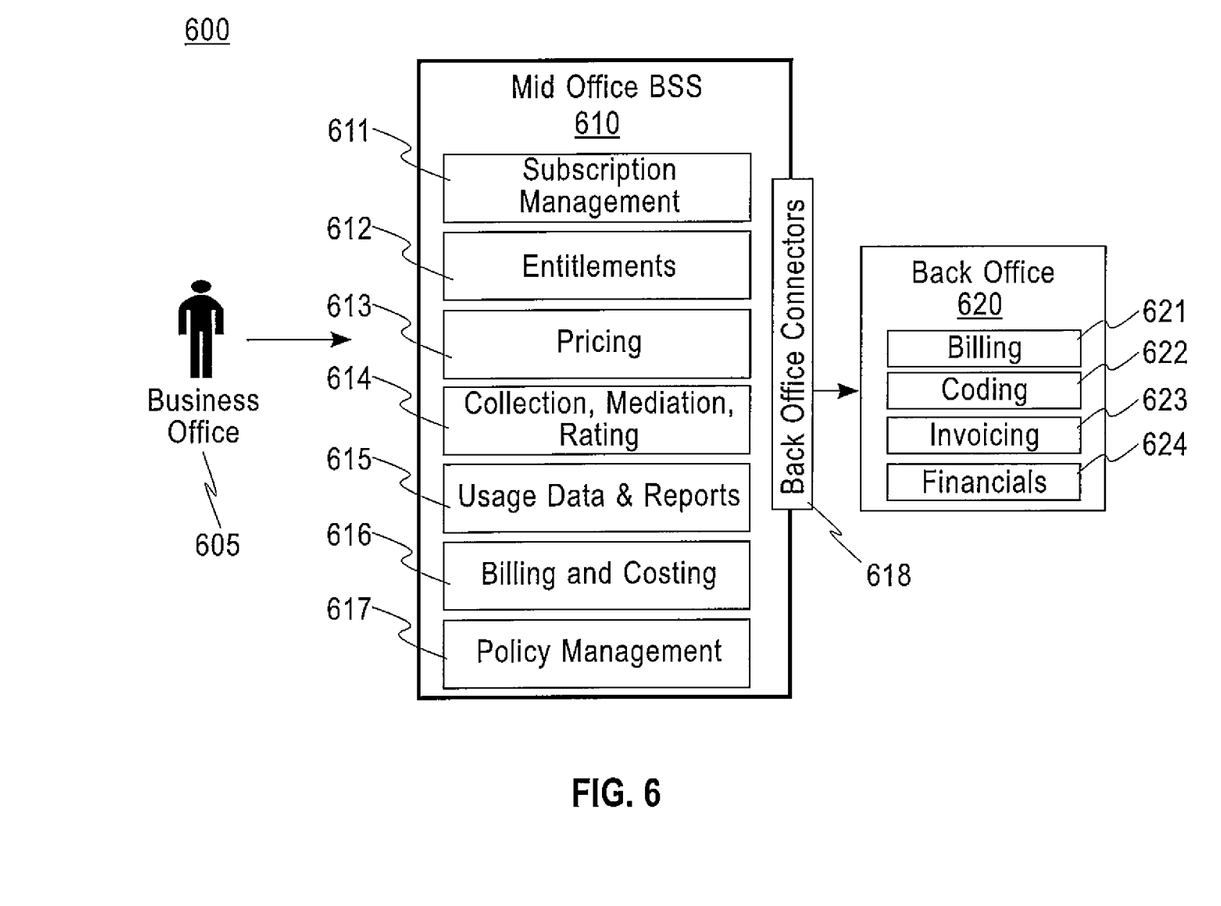
FIG. 6 demonstrates an exemplary embodiment of a $BSS_{Mid\ Office}$.

FIG. 6 demonstrates an exemplary embodiment of a $BSS_{Mid\ Office}$ 600. The mid office BSS 610 allows a business office user 605 to access the mid office BSS services. Such services include subscriber management 611, entitlements 612, pricing 613, collection, mediation, rating 614, usage data and reports 615, billing and costing 616 and policy management 617. A back office connector 618 enables access to a back office 620 which provides modules for billing 621, costing 622, invoicing 623 and financials 624.

Various exemplary embodiments processes input describing a system (such as a topology, process and 'as is' resiliency graph, for example) and determine modifications to the system in order to optimize the system for various HA purposes. The system description may describe serial and parallel paths, dependencies and other system aspects, such as, hardware (HW) and software (SW) failure distributions, for example. Additional information may also be provided in order to describe any desired HA service level agreement (SLA), environment temperature distribution and/or synchronization requirements (when not provided at the process level and/or technical level through validations).

Upon completion various exemplary embodiments supply information for parallel redundancy and K-redundancy, for example, with a modified topology graph or other description of the processes and changes. Parallel redundancy may be provided such as for a application server farm, or data center replication. K-redundancy includes shared infrastructure for independent network links and/or independent processes. Independent processes (such as, edges in a topology graph) do not have overlapping systems (such as, vertices in a topology graph). Serial redundancy may also include notifications for manual processes.

An exemplary embodiment is a method to provide K-redundant resiliency for cloud computer. The method discovers (or creates) the system and network topology graph. The processes/clients flows are mapped on top of the topology graph. Next, the method identifies system overlaps and dependencies among processes' systems and site deployment single points of failure. Customer and business support processes may overlap due to common application to provide web front end and underlying services. Software packaging may include various dependencies (such as data repository RO for customer processes, while WR for business support processes for example). An example of a single point of failure is a common web front deployed in one data center.

Based on the data in the topology graph and the mapped flows, the component model representation can be transformed from the current state into a graph representation. Processes and their systems/components may be detailed and classified based on their individual resiliency requirements. For example, customer processes and business support processes may have different HA requirements.

A business support processes may desire less strong resiliency than a customer processes and can be hosted on less hardware while a customer processes may request high-availability data replication (HADR) and operational scaling which may involve more hardware usage. In one example, customer processes do not allow rollover-to-standby delay; instead, preferring an active-active operational environment. Additionally, customer processes may use distributed locations allowing for reduced latency for web-based customers. Customer processes may also wish to enable rolling upgrade of customers. In contrast, batch environment failures may only impact the business support and catalog update activities.

Next, the method translates the SLA constraints (such as, performance, management, etc.) into IT features in the resiliency graph. Some cloud systems may not carry specific SLAs, in such case, other types of constraints may be translated.

The method also generates a unified resiliency graph/documentation (describing how the system is "to be") through 1:K replication for critical systems and setup of backup capacity for independent sub-processes. Front office critical systems may be provided as parallel systems and set up with active-active operational environment and replication. Independent processes (such as business support processes and customer facing processes) may be split into different systems and are deployed with different HA solutions.

Figure 7:
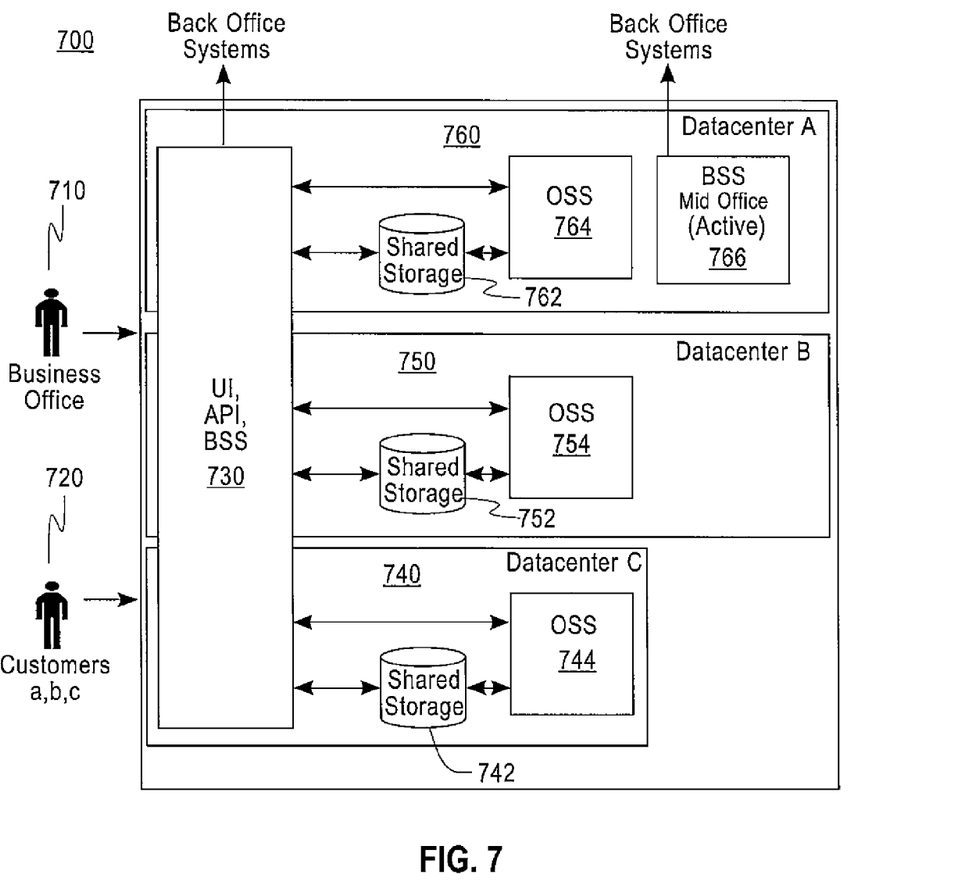
FIG. 7 illustrates an exemplary embodiment of a cloud computing arrangement.

FIG. 7 illustrates an exemplary embodiment 700 of a cloud computing arrangement. In the initial setup, a business office user 710 and customers 720 share access to the various services via a single UI/API/BSS 730. The services are provided through three data centers 760, 750, 740. Datacenter A 760 includes a storage device 762, an OSS 764 and a first mid office BSS instance 766. Datacenter B 750 and datacenter C 740 also include storage devices 752, 742 and OSS 754, 744.

If the UI/API/BSS 730 (a common web front) in FIG. 7 is identified as a potential point of failure, the business office user 710 is moved to use the first mid office BSS instance 766 while the first customer 722, the second customer 724 and third customer 726 are each provided a separate instance of a UI/API/BSS 732, 734, 736.

The individual instances of a UI/API/BSS 732, 734, 736 are parallel systems and have an active-active operational environment. In this case, K is three (for the three instances of the UI/API/BSS 732, 734, 736) providing a 3-redundant resiliency system.

The first mid office BSS instance 766 is a critical systems and may be setup with a backup capacity for independent sub-processes.

Another potential point of failure is identified as the first mid office BSS instance 766. Thus, a second mid office BSS instance 756 is created for datacenter B 750. This second mid office BSS instance 756 is initially set up in a standby mode.

In order to complete the replication of the UI/API/BSS 710, data replication 772 is setup to ensure reasonably synched data for the first instance of a UI/API/BSS 732, the second instance of a UI/API/BSS 734 and the third instance of a UI/API/BSS 736. Likewise, data replication 774 is setup for the (active) first mid office BSS instance 766 and the second mid office BSS instance 756 (on standby).

A point of failure may be the first instance of a UI/API/BSS 732, for example, the first instance of a UI/API/BSS 732 may lock up or otherwise become non-responsive. This prevents the first customer 722 from accessing cloud computing services via datacenter A 760.

In order to resolve the failure, the first customer 722 is allowed to share the second instance of a UI/API/BSS 734 with a second customer 724. Due to the data replication 772, the transfer can occur with minimal impact on services provided to the first customer 722 (or even occur transparently). The third customer 726 should experience little to no impact on the third instance of a UI/API/BSS 736.

A second point of failure is the first mid office BSS instance 766. This would prevent the business office user 710 accessing cloud computing services via datacenter A 760.

In order to resolve this second point of failure, the business office user 710 may be moved from the failed first mid office BSS instance 766 to the second mid office BSS instance 756 in datacenter B 750. Accordingly, the second mid office BSS instance 756 is now made active.

Figure 8:
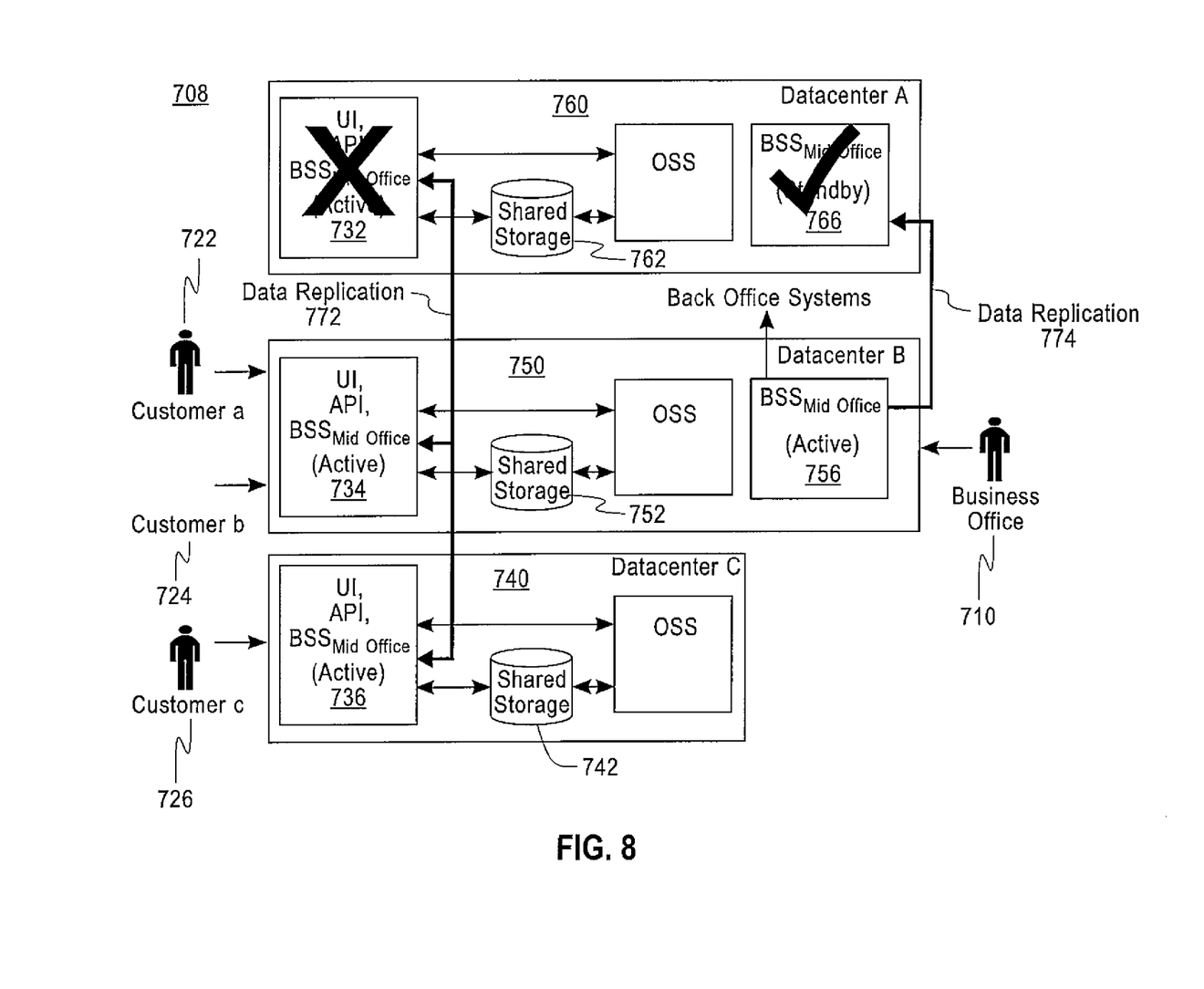
FIG. 8 illustrates a final HA solution computed using this disclosure starting from the initial cloud computing arrangement illustrated in FIG. 7 which lacks HA.

FIG. 8 illustrates the modified exemplary embodiment 708 of the cloud computing arrangement after resolution of the various failures and is a final HA solution starting from the initial cloud computing arrangement illustrated in FIG. 7 which lacks HA. The first mid office BSS instance 766 is re-instantiated for datacenter A 760 in a standby mode. The mid office BSS data replication 774 is modified in order to ensure the first mid office BSS instance 766 has sufficiently synched data from the second mid office BSS instance 756.

Based on the foregoing it should be apparent that various exemplary embodiments provide a method, apparatus and computer program(s) to provide resiliency in cloud computer systems. Resiliency is provided by considering processes' dependency in view of optimally sharing of the replicated infrastructure. Capacity planning, HA and migration concerns are combined in virtual environment.

Figure 9:
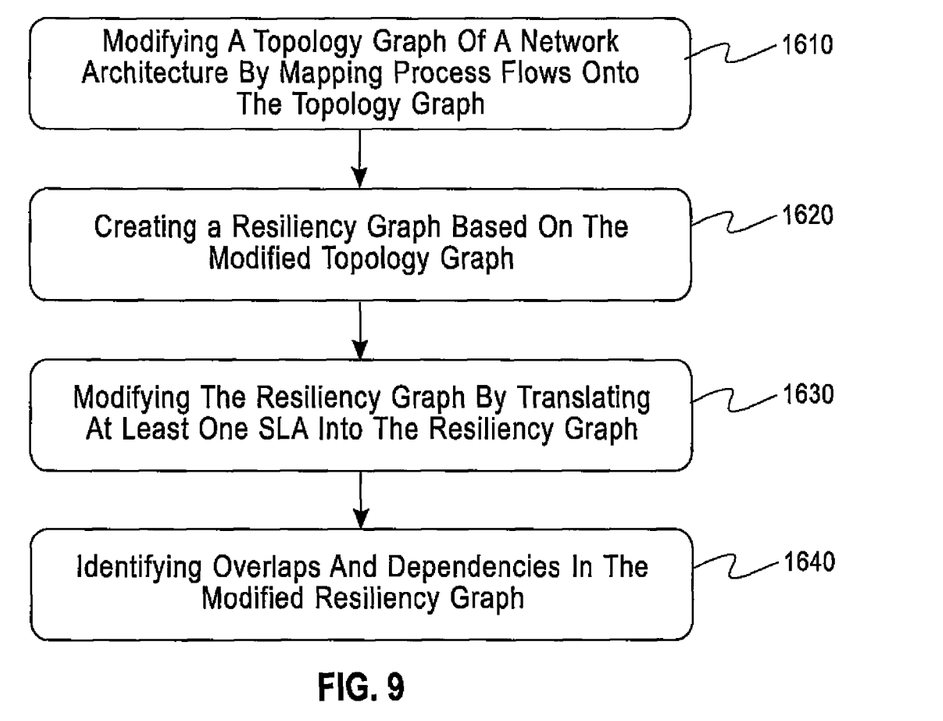
FIG. 9 is a logic flow diagram that illustrates the operation of an exemplary method, and a result of execution of computer program instructions embodied on a computer readable memory, in accordance with various exemplary embodiments.

FIG. 9 is a logic flow diagram that illustrates the operation of a method, and a result of execution of computer program instructions, in accordance with exemplary embodiments. In accordance with these exemplary embodiments a method performs, at Block 1610, a step of modifying a topology graph of a network architecture by mapping processes flows onto the topology graph. At Block 1620, the method performs a step of creating a resiliency graph based on the modified topology graph. A step of modifying the resiliency graph by translating at least one SLA into the resiliency graph is performed at Block 1630. At Block 1640, the method also performs a step of identifying overlaps and dependencies in the modified resiliency graph (for example, by saving the identified overlaps and dependencies to a data file, displaying the identified overlaps and dependencies, etc.).

The various blocks shown in FIG. 9 may be viewed as method steps, and/or as operations that result from operation of computer program code, and/or as a plurality of coupled logic circuit elements constructed to carry out the associated function(s).

Figure 10:
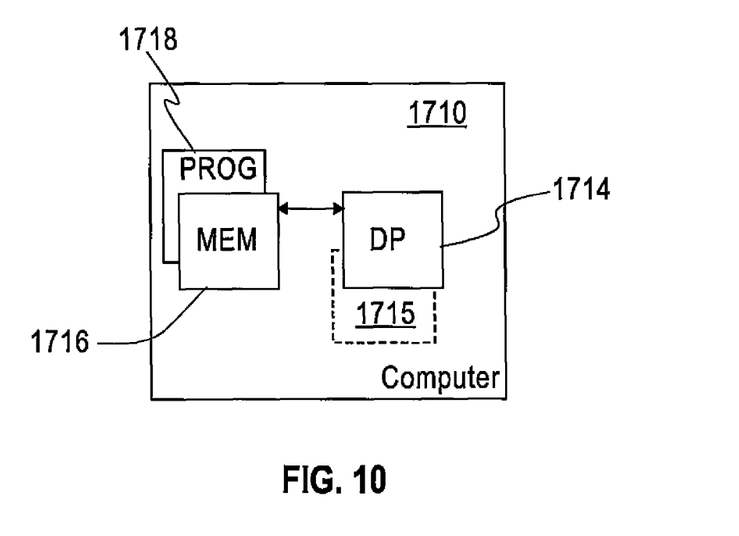
FIG. 10 shows a simplified block diagram of an exemplary electronic device that is suitable for use in practicing various exemplary embodiments.

Reference is made to FIG. 10 for illustrating a simplified block diagram of an electronic device and apparatus that is suitable for use in practicing various exemplary embodiments.

In FIG. 10, an apparatus, such as a computer 1710 is depicted, which is suitable for use as any one of computers 112, 114, 116 or server 120. The computer 1710 includes a controller, such as a computer or a data processor (DP) 1714, and a computer-readable memory medium embodied as a memory (MEM) 1716 that stores a program of computer instructions (PROG) 1718.

The PROGs 1718 is assumed to include program instructions that, when executed by the DP 1714, enables the device to operate in accordance with exemplary embodiments.

That is, various exemplary embodiments may be implemented at least in part by computer software executable by the DP 1714 of the computer 1710, by hardware (HW), or by a combination of software (SW) and hardware (and firmware).

The computer 1710 may also include a dedicated processor, for example, cloud computing processor 1715.

The computer readable MEM 1716 may be of any type suitable to the local technical environment and may be implemented using any suitable data storage technology, such as semiconductor based memory devices, flash memory, magnetic memory devices and systems, optical memory devices and systems, fixed memory and removable memory. The DP 1714 may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips, and that the exemplary embodiments may be realized in an apparatus that is embodied as an integrated circuit. The integrated circuit, or circuits, may comprise circuitry (as well as possibly firmware) for embodying at least one or more of a data processor or data processors and memories that are configurable so as to operate in accordance with the exemplary embodiments.

An exemplary embodiment provides a method for enabling resiliency for cloud computing systems. The method includes modifying (such as by a processor) a topology graph of a network architecture by mapping processes flows onto the topology graph. The method includes creating (such as by a processor) a resiliency graph based on the modified topology graph. The method includes modifying (such as by a processor) the resiliency graph by translating at least one SLA into the resiliency graph. The method also includes identifying (such as by a processor) overlaps and dependencies in the modified resiliency graph.

In another exemplary embodiment of the method above, the method also includes determining at least one potential, point of failure based on the overlaps and dependencies.

In a further exemplary embodiment of any one of the methods above, the method also includes classifying the potential point of failure.

In another exemplary embodiment of any one of the methods above, the method also includes, in response to determining that the potential point of failure is a subsystem shared by multiple processes, splitting the subsystem into a plurality of instances of the subsystem.

In a further exemplary embodiment of any one of the methods above, the method also includes, in response to determining that the potential point of failure is a plurality of critical subsystems shared by multiple processes, ensuring the plurality of critical subsystems does not share a hypervisor.

In another exemplary embodiment of any one of the methods above, the method also includes, in response to determining that the potential point of failure is a plurality of non-critical subsystem shared by multiple processes, allowing the plurality of non-critical subsystem to share infrastructure resources.

In a further exemplary embodiment of any one of the methods above, the method also includes, in response to determining that the potential point of failure is a replicated subsystem, determining a primary and backup split for the replicated subsystem.

In another exemplary embodiment of any one of the methods above, the method also includes calculating resiliency based on an infrastructure of the network architecture.

In a further exemplary embodiment of any one of the methods above, the method also includes classifying processes based on resiliency requirements.

Another exemplary embodiment provides an apparatus for enabling resiliency for cloud computing systems. An apparatus includes a processor (such as DP 1714) and a memory (such as MEM 1716) storing computer program code (such as PROG 1718). The memory and the computer program code are configured to, with the processor, cause the apparatus to perform actions. The actions include modifying a topology graph of a network architecture by mapping processes flows onto the topology graph. The actions include creating a resiliency graph based on the modified topology graph. The actions include modifying the resiliency graph by translating at least one SLA into the resiliency graph. The actions also include identifying overlaps and dependencies in the modified resiliency graph.

In a further exemplary embodiment of the apparatus above, the actions also include determining at least one potential point of failure based on the overlaps and dependencies.

In another exemplary embodiment of any one of the apparatus above, the actions also include classifying the potential point of failure.

In a further exemplary embodiment of any one of the apparatus above, the actions also include, in response to determining that the potential point of failure is a subsystem shared by multiple processes, splitting the subsystem into a plurality of instances of the subsystem.

In another exemplary embodiment of any one of the apparatus above, the actions also include, in response to determining that the potential point of failure is a plurality of critical subsystems shared by multiple processes, ensuring the plurality of critical subsystems does not share a hypervisor.

In a further exemplary embodiment of any one of the apparatus above, the actions also include, in response to determining that the potential point of failure is a plurality of non-critical subsystem shared by multiple processes, allowing the plurality of non-critical subsystem to share infrastructure resources.

In another exemplary embodiment of any one of the apparatus above, the actions also include, in response to determining that the potential point of failure is a replicated subsystem, determining a primary and backup split for the replicated subsystem.

In a further exemplary embodiment of any one of the apparatus above, the actions also include calculating resiliency based on an infrastructure of the network architecture.

In another exemplary embodiment of any one of the apparatus above, the actions also include classifying processes based on resiliency requirements.

A further exemplary embodiment provides an article of manufacture for enabling resiliency for cloud computing systems. The article of manufacture tangibly embodies computer readable instructions which, when implemented, cause a computer to carry out the steps of a method. The method includes modifying a topology graph of a network architecture by mapping processes flows onto the topology graph. The method includes creating a resiliency graph based on the modified topology graph. The method includes modifying the resiliency graph by translating at least one SLA into the resiliency graph. The method also includes identifying overlaps and dependencies in the modified resiliency graph.

In another exemplary embodiment of the article of manufacture above, the method also includes determining at least one potential point of failure based on the overlaps and dependencies.

In a further exemplary embodiment of any one of the articles of manufacture above, the method also includes classifying the potential point of failure.

In another exemplary embodiment of any one of the articles of manufacture above, the method also includes, in response to determining that the potential point of failure is a subsystem shared by multiple processes, splitting the subsystem into a plurality of instances of the subsystem.

In a further exemplary embodiment of any one of the articles of manufacture above, the method also includes, in response to determining that the potential point of failure is a plurality of critical subsystems shared by multiple processes, ensuring the plurality of critical subsystems does not share a hypervisor.

In another exemplary embodiment of any one of the articles of manufacture above, the method also includes, in response to determining that the potential point of failure is a plurality of non-critical subsystem shared by multiple processes, allowing the plurality of non-critical subsystem to share infrastructure resources.

In a further exemplary embodiment of any one of the articles of manufacture above, the method also includes, in response to determining that the potential point of failure is a replicated subsystem, determining a primary and backup split for the replicated subsystem.

In another exemplary embodiment of any one of the articles of manufacture above, the method also includes calculating resiliency based on an infrastructure of the network architecture.

In a further exemplary embodiment of any one of the articles of manufacture above, the method also includes classifying processes based on resiliency requirements.

In another exemplary embodiment of any one of the articles of manufacture above, the articles of manufacture is a non-transitory computer readable medium (e.g., CD-ROM, RAM, flash memory, etc.).

In a further exemplary embodiment of any one of the articles of manufacture above, the articles of manufacture is a storage medium.

Another exemplary embodiment provides an apparatus for enabling resiliency for cloud computing systems. The apparatus includes means for modifying (such as a processor) a topology graph of a network architecture by mapping processes flows onto the topology graph. The apparatus includes means for creating (such as a processor) a resiliency graph based on the modified topology graph. The apparatus includes means for modifying (such as a processor) the resiliency graph by translating at least one SLA into the resiliency graph. The apparatus also includes means for identifying (such as a processor) overlaps and dependencies in the modified resiliency graph.

In a further exemplary embodiment of the apparatus above, the apparatus also includes means for determining at least one potential point of failure based on the overlaps and dependencies.

In another exemplary embodiment of any one of the apparatus above, the apparatus also includes means for classifying the potential point of failure.

In a further exemplary embodiment of any one of the apparatus above, the apparatus also includes means for splitting the subsystem into a plurality of instances of the subsystem in response to determining that the potential point of failure is a subsystem shared by multiple processes.

In another exemplary embodiment of any one of the apparatus above, the apparatus also includes means for ensuring the plurality of critical subsystems does not share a hypervisor in response to determining that the potential point of failure is a plurality of critical subsystems shared by multiple processes.

In a further exemplary embodiment of any one of the apparatus above, the apparatus also includes means for allowing the plurality of non-critical subsystem to share infrastructure resources in response to determining that the potential point of failure is a plurality of non-critical subsystem shared by multiple processes.

In another exemplary embodiment of any one of the apparatus above, the apparatus also includes means for determining a primary and backup split for the replicated subsystem in response to determining that the potential point of failure is a replicated subsystem.

In a further exemplary embodiment of any one of the apparatus above, the apparatus also includes means for calculating resiliency based on an infrastructure of the network architecture.

In another exemplary embodiment of any one of the apparatus above, the apparatus also includes means for classifying processes based on resiliency requirements.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:
API application programming interface
BSS business support service
CC_BSS cloud computing BSS
CC_UI cloud computing user interface
CRUD create, read, update and delete DB database
DB2 a relational model database server
ECW enhanced compression wavelet
HA high availability
HADR high-availability data replication
HW hardware
IP internet protocol
IT information technology
LDAP lightweight directory access protocol
MTBF mean time between failures
MTTF mean time to failure
nmap network map
OSS operation support service
RO read only
SLA service level agreement
SPoF single point of failure
SW software
UI user interface
VM virtual machine
WR write/read

What is claimed is:

1. An apparatus, comprising a processor; and a memory including computer program code, the memory and the computer program code configured to, with the processor, cause the apparatus to perform at least the following:
to modify a topology graph of a network architecture by mapping processes flows onto the topology graph;
to create a resiliency graph based on the modified topology graph;
to modify the resiliency graph by translating at least one service level agreement into the resiliency graph; and
to identify overlaps and dependencies in the modified resiliency graph.

2. The apparatus of claim 1, where the memory and the computer program code are further configured to cause the apparatus to determine at least one potential point of failure based on the overlaps and dependencies.

3. The apparatus of claim 2, where the memory and the computer program code are further configured to cause the apparatus to classify the potential point of failure.

4. The apparatus of claim 2, where the memory and the computer program code are further configured to cause the apparatus to split the subsystem into a plurality of instances of the subsystem in response to determining that the potential point of failure is a subsystem shared by multiple processes.

5. The apparatus of claim 2, where the memory and the computer program code are further configured to cause the apparatus to ensure the plurality of critical subsystems does not share a hypervisor in response to determining that the potential point of failure is a plurality of critical subsystems shared by multiple processes.

6. The apparatus of claim 2, where the memory and the computer program code are further configured to cause the apparatus to allow the plurality of non-critical subsystem to share infrastructure resources in response to determining that the potential point of failure is a plurality of non-critical subsystem shared by multiple processes.

7. The apparatus of claim 2, where the memory and the computer program code are further configured to cause the apparatus to, determine a primary and backup split for the replicated subsystem in response to determining that the potential point of failure is a replicated subsystem.

8. An article of manufacture comprising a non-transitory computer-readable medium tangibly embodying computer readable instructions which, when implemented, cause a computer to carry out the steps of a method comprising:
modifying a topology graph of a network architecture by mapping processes flows onto the topology graph;
creating a resiliency graph based on the modified topology graph;
modifying the resiliency graph by translating at least one service level agreement into the resiliency graph; and
identifying overlaps and dependencies in the modified resiliency graph.

9. The article of manufacture of claim 8, where the steps of the method further comprise, in response to determining that a potential point of failure is a subsystem shared by multiple processes, splitting the subsystem into a plurality of instances of the subsystem.

10. The article of manufacture of claim 8, where the steps of the method further comprise, in response to determining that the potential point of failure is a plurality of non-critical subsystem shared by multiple processes, allowing the plurality of non-critical subsystem to share infrastructure resources.

11. The article of manufacture of claim 8, where the steps of the method further comprise, in response to determining that the potential point of failure is a replicated subsystem, determining a primary and backup split for the replicated subsystem.

12. A method comprising:
modifying a topology graph of a network architecture by mapping processes flows onto the topology graph;
creating a resiliency graph based on the modified topology graph;
modifying the resiliency graph by translating at least one service level agreement into the resiliency graph; and
identifying overlaps and dependencies in the modified resiliency graph.

13. The method of claim 12, further comprising determining at least one potential point of failure based on the overlaps and dependencies.

14. The method of claim 13, further comprising classifying the potential point of failure.

15. The method of claim 13, further comprising in response to determining that the potential point of failure is a subsystem shared by multiple processes, splitting the subsystem into a plurality of instances of the subsystem.

16. The method of claim 13, further comprising in response to determining that the potential point of failure is a plurality of critical subsystems shared by multiple processes, ensuring the plurality of critical subsystems does not share a hypervisor.

17. The method of claim 13, further comprising in response to determining that the potential point of failure is a plurality of non-critical subsystem shared by multiple processes, allowing the plurality of non-critical subsystem to share infrastructure resources.

18. The method of claim 13, further comprising in response to determining that the potential point of failure is a replicated subsystem, determining a primary and backup split for the replicated subsystem.

19. The method of claim 12, further comprising calculating resiliency based on an infrastructure of the network architecture.

20. The method of claim 12, further comprising classifying processes based on resiliency requirements.

* * * * *